United States Patent
Stähle

[11] 3,937,254
[45] Feb. 10, 1976

[54] DEVICE FOR MONITORING CONTROL ELEMENTS

[75] Inventor: Kurt Stähle, Neuhausen-Steinegg, Germany

[73] Assignee: Concordia Fluidtechnik GmbH Steuergerate, Germany

[22] Filed: Mar. 4, 1974

[21] Appl. No.: 447,832

[30] Foreign Application Priority Data
Mar. 9, 1973 Germany............................ 2311698

[52] U.S. Cl. .............. 137/637; 91/459; 137/596.16
[51] Int. Cl.² ......................................... F15B 20/00
[58] Field of Search ......... 91/459, 461; 137/596.16, 137/637, 552, 554; 335/237, 238; 251/65

[56] References Cited
UNITED STATES PATENTS

| | | | |
|---|---|---|---|
| 2,289,574 | 7/1942 | Carlson | 251/65 |
| 2,912,218 | 11/1959 | Stillwagon | 251/110 X |
| 3,139,109 | 6/1964 | Ruchser | 137/596.16 |
| 3,194,269 | 7/1965 | Williams | 137/614.11 |
| 3,670,767 | 6/1972 | Mahorney | 137/596.16 UX |

*Primary Examiner*—Alan Cohan
*Assistant Examiner*—Gerald A. Michalsky
*Attorney, Agent, or Firm*—Craig & Antonelli

[57] ABSTRACT

A device for monitoring the relative position of synchronously moved valve cases in safety valves controlling pneumatic or hydraulic drives. Fixedly attached to each valve case and symmetrically disposed one to the other is a member of a metallic material, arranged proximate to the free ends of a pivotally mounted magnetic bar. The axis of rotation of the magnetic bar, which is aligned with the synchronous position of the valve cases in its basic position, is parallel to the direction of movement of the valve cases, and a swing of the magnetic bar, which only occurs in the event of a defect, i.e. if the valve cases do not operate in synchronism, provides a signal for making the monitored drive inoperative.

15 Claims, 5 Drawing Figures

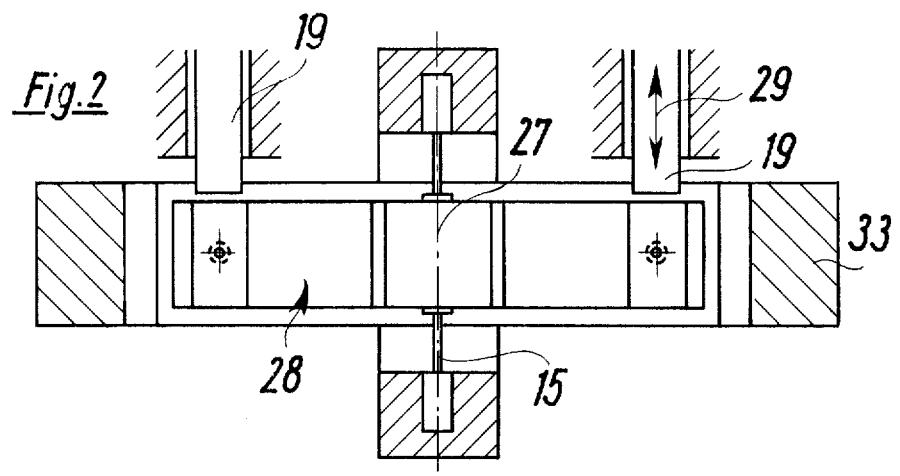
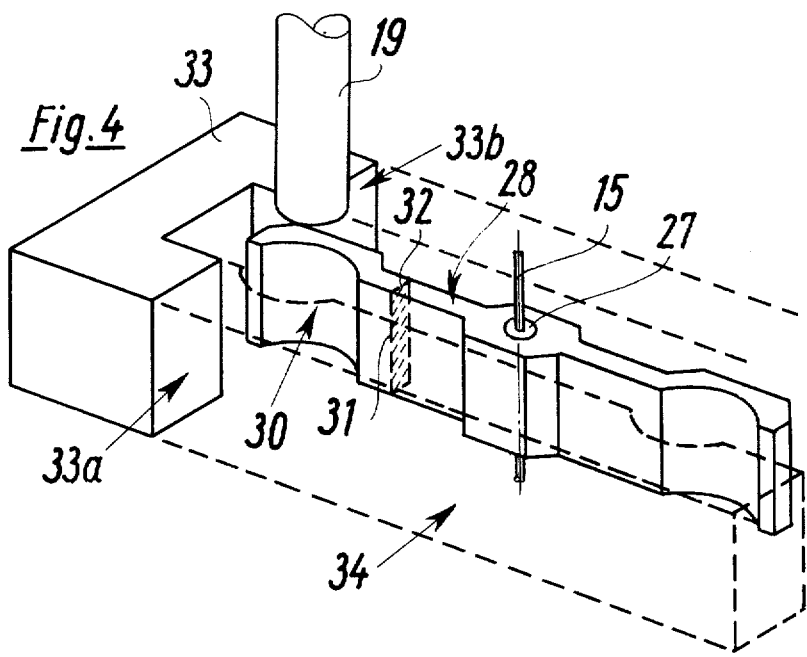

DEVICE FOR MONITORING CONTROL ELEMENTS

The present invention relates to a device for monitoring the relative position of synchronously moved control elements, especially for monitoring the movement of two valve cases in safety valve controlling a pneumatic or hydraulic drive, in which a member of a magnetic material is fixedly disposed at each of the valve cases and symmetrically arranged with respect to one another, each being disposed proximate to the free ends of a pivotally mounted magnetic bar whose basic position is aligned with the synchronous position of the valve cases and which triggers a signal for making the drive inoperative in the event the magnetic bar is swivelled out of its basic position, and which influences the magnetic bar magnetically.

Monitoring devices of this type provide the advantage that a maintenance-free, dependable monitoring device is created, in which the position of the magnetic bar remains uninfluenced with the desired synchronous operation of the valve cases, while it deviates from the basic position with asynchronous operation, i.e. when there are irregularities in the safety valve. The swing movement of the magnetic bar can be employed for triggering a pulse for providing indication of the defect. There are no components which are subject to wear.

However, it has been shown that with control valves having fast stroke sequences this type of monitoring cannot be readily performed, as the forces exerted on the magnetic bar by the magnetic members are not sufficient, in the brief period of time available, for overcoming the inertial forces of the magnetic bar. This is primarily due to the fact that the curve of force peaks in this type of arrangement of a magnetic bar, with the peak being achieved at approximately the same time that the bottom edges of the magnetic members reach the top edge of the magnetic bar. From this point on, the magnetic force declines again, so that in the case of rapid motion of the valve cases the declining leg of the force curve is already reached before the magnetic bar can swing, as a result of its inertia.

It is the object of the present invention to make the known monitoring device serviceable for high-speed valves also, so as to provide dependable monitoring in every case, irregardless of their design and the speed of their operation.

According to the present invention, the axis of rotation of the magnetic bar is disposed parallel to the direction of movement of the members of a magnetic material attached to the valve cases. Through this design, as opposed to the known solution, the effective surface for the egression of the magnetic lines of force increases as the stroke of the valve cases increases, so that the magnetic force exerted on the magnetic bar constantly increase. This also permits proper defect indication with rapid operation of the valve cases, as there is no reduction in the magnetic force.

In order to be able to design the magnetic circuit as well as possible, the ends of the magnetic bar can have recesses which face the members of a magnetic material on the valve cases. These recesses can also be matched to the dimensions of the members of a magnetic material, whereby however it should be noted that in swinging the magnetic bar must not be able to strike the magnetic members.

It has been shown to be especially advantageous for the magnetic bar to have a generally rectangular cross section, whereby the sides extending parallel to the axis of rotation are significantly greater than the sides extending at right angles to the axis of rotation. Through this configuration, it is possible to utilize the entire stroke of the valve cases for increasing the magnetic force, since, as already described above, with this configuration the magnetic force also increases with the increasing stroke. If the side of the cross section of the magnetic bar extending parallel to the axis of rotation is therefore dimensioned so that it just corresponds to the maximum plunger stroke of the valve cases, the maximum achievable magnetic force can be realized, without the magnetic bar itself being subject to excessive inertial forces, as the total mass of the magnetic bar can be kept to a minimum.

Horseshoe magnets can be disposed at both ends of the magnetic bar, with their poles being bridged by soft-iron members. The soft-iron members can also have recesses which are matched to the dimensions of the magnetic members on the valve cases. The magnetic circuit can also be improved through this measure.

The above discussed and other objects, features and advantages of the present invention will become more apparent from the following description thereof, when taken in connection with the accompanying drawings, in which;

FIG. 2 shows a schematic view, with a partial longitudinal cross section, of a monitoring device designed in accordance with the present invention and intended for employment in place of the monitoring device shown in FIG. 1, with the axis of rotation of the magnetic bar extending in the direction of movement of the valve cases;

FIG. 4 shows a schematic, perspective view of the embodiment of FIGS. 2 and 3.

Figure 1:
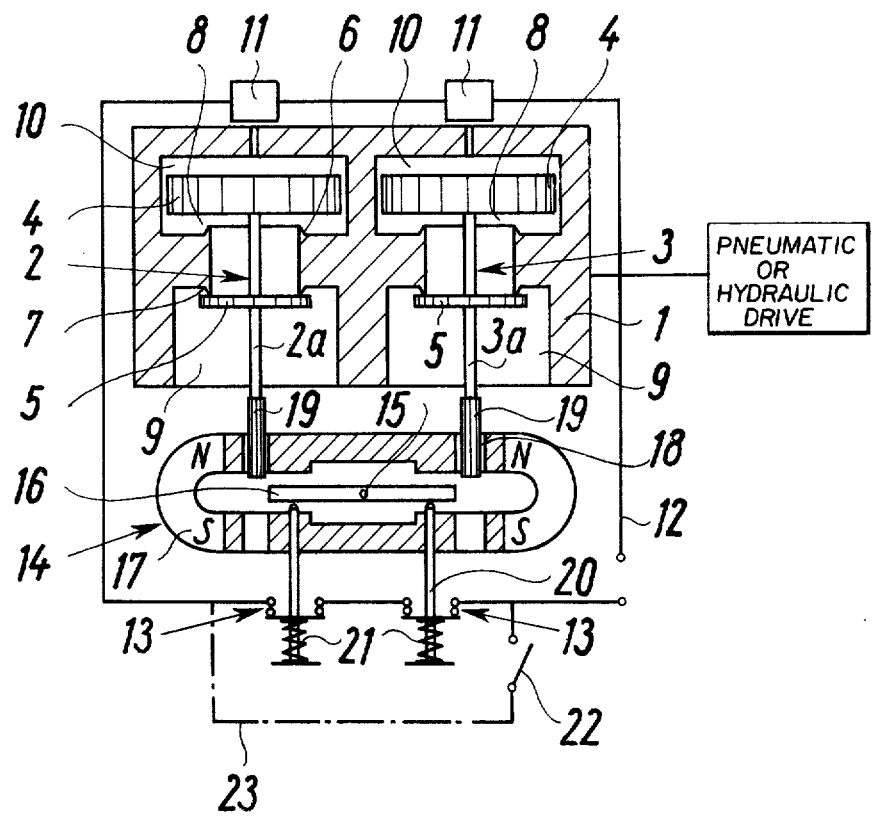
FIG. 1 shows the overall arrangement of the known monitoring device on a dual valve, whereby the axis of rotation of the magnetic bar extends perpendicularly to the direction of movement of the valve cases.

Referring now to the drawings, wherein like reference numerals designate like parts throughout the several views, FIG. 1 shows two valve cases 2 and 3 disposed within the housing 1 of a safety valve. Each valve case comprises a valve stem 2a and 3a respectively, a valve element 4 having the shape of a piston, and a disc valve member 5 attached to the valve stem. The valve cases 2 and 3 are arranged within the housing 1 in such a manner that they respectively close or uncover valve seats 6 and 7 during their upward and downward movement. The valve seats connect an upper pressure medium chamber 8 and a lower pressure medium chamber 9 one with the other, the chambers being charged with the pressure medium in a conventional manner not illustrated in detail.

In the illustrated position, the disc valves 5 respectively seal the lower valve seat 7, so that the communication between the chambers 8 and 9 is interrupted. If the pressure medium is introduced into the space 10 located above each of the pistons 4, the valve cases 2 and 3 move downwardly, the disc valves free the valve seats, and the pressure chambers 8 and 9 are placed in communication with each other. The feed and discharge ducts of the pressure medium into and out of the chambers 8 and 9 are not illustrated.

The pressure medium enters the spaces 10 above the pistons 4 through auxiliary control valves 11, which are controlled electromagnetically and arranged in a circuit 12, in which two switches 13 are disposed, as will be discussed below. Valves of the illustrated type are contained in the known monitoring device. They are employed for the control of hydraulic presses, for example, where perfect functioning of the valves is important in order to preclude injury to the operating personnel, for example. For this purpose, the two valve cases 2 and 3 are connected in parallel, so that even if one valve case should become inoperative due to a defect, proper functioning of the safety valve is still ensured. A prerequisite therefor is that the valve cases 2 and 3 are each moved in synchronism and, in the event that this synchronous movement is absent, a defect signal is triggered, which ensures that the operating equipment connected thereto, for example the hydraulic press, is made inoperative. The safety regulations stipulate that the press may not be put back into operation again until the defect in the valve or in the supply line thereto has been remedied.

In order to monitor the synchronous operation of the valve cases 2 and 3, a known monitoring method provides a monitoring device 14 which comprises primarily a magnetic bar 16 mounted on a torsion rod 15 and a permanent magnet designed as a soft-iron bridge 17. The permanent magnet has apertures 18 into which the extensions 19 of the valve stems 2a and 3a, which are of a magnetic material, extend. The magnetic bar 16 itself can have a configuration such that the extensions 19 sweep past the ends thereof. Alternately, it is also possible for this magnetic bar 16 to have holes, through which the extensions 19 can be extended, thereby being able to exert a stronger magnetic force. The magnetic bar 16 is held in position by a torsion bar 15 in such a manner that its axis of rotation is perpendicular to the direction of movement of the valve cases 2a and 3a. In the basic position shown, the magnetic bar 16 is held by the spring force of the torsion rod 15, on the one hand, and by the two plunger 20, on the other, under the influence of springs 21 which press the plungers 20 against the magnetic bar 16, keeping the above mentioned switches 13 in the closed position.

If the operation of the safety valve is synchronous, the position of the magnetic bar 16 therefore remains unchanged. In the event of asynchronous operation, the magnetic bar 16 is rotated about the torsion rod 15 and swings either clockwise or counter-clockwise, actuating one of the switches 13 so that the auxiliary control valves 11 interrupt the supply of the pressure medium to the chambers 10, and the entire valve remains in the indicated position, in which the supply of pressure medium to the operating cylinder is interrupted.

Figure 5:
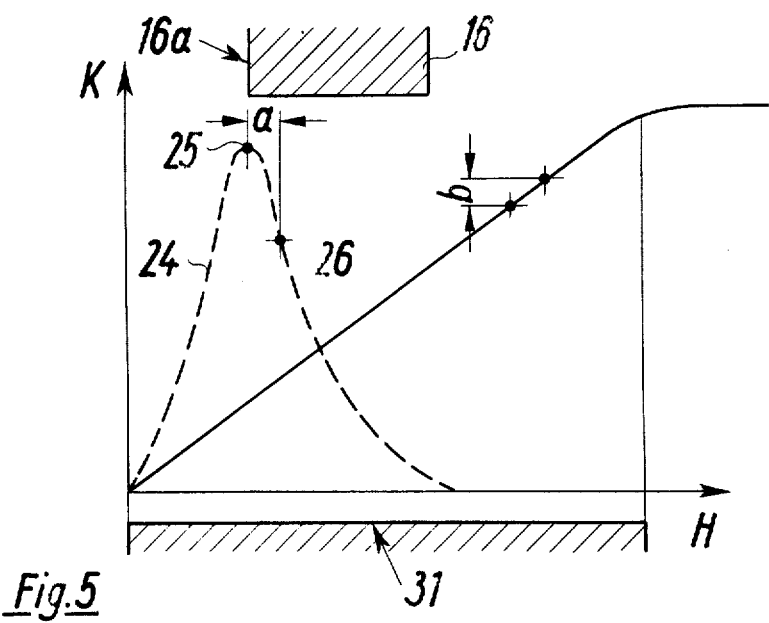
FIG. 5 shows a schematic representation of the curve of forces at the magnetic bar with the known monitoring device and with an embodiment according to the present invention.

It has been shown that, with this arrangement in which the axis of rotation of the magnetic bar 16 is perpendicular to the direction of movement of the extensions 19, the magnetic force distribution between the extensions 19 and the magnetic bar 16 is poor insofar as the magnetic force curve peaks, which can be seen in detail from FIG. 5, where this force curve is indicated by a dash line. In this drawing, the stroke H of the valve cases is indicated on the abscissa and the magnetic force K occurring between the magnetic bar and the extensions is indicated on the ordinate.

With an arrangement in which, according to the known proposal, there is a hole in the magnetic bar through which the extensions are passed and in which it is assumed that the bottom edges of the extensions 19 are located generally at zero of the coordinate system, the magnetic force shown according to line 24 increases until it peaks, which occurs when the bottom edge of the extension 19 has reached the top edge 16a of the schematically indicated magnetic bar 16. Since in this known embodiment the magnetic bar 16 swings toward the abscissa, the indicated distance between zero and the top edge 16a of the magnetic bar is necessary to permit the swing. The qualitatively indicated magnetic force curve shows that the magnetic forces decline again after reaching this peak. As a result, with rapid stroke motions, the inertial forces of the magnetic bar 16 are too great to permit it to react. If, during a swing, the magnetic bar 16 then moves distance a in a direction opposite to the direction of movement of the valve cases, there is a loss of force, as the peak is shifted, which corresponds generally to the perpendicular distance between points 25 and 26.

Figure 3:
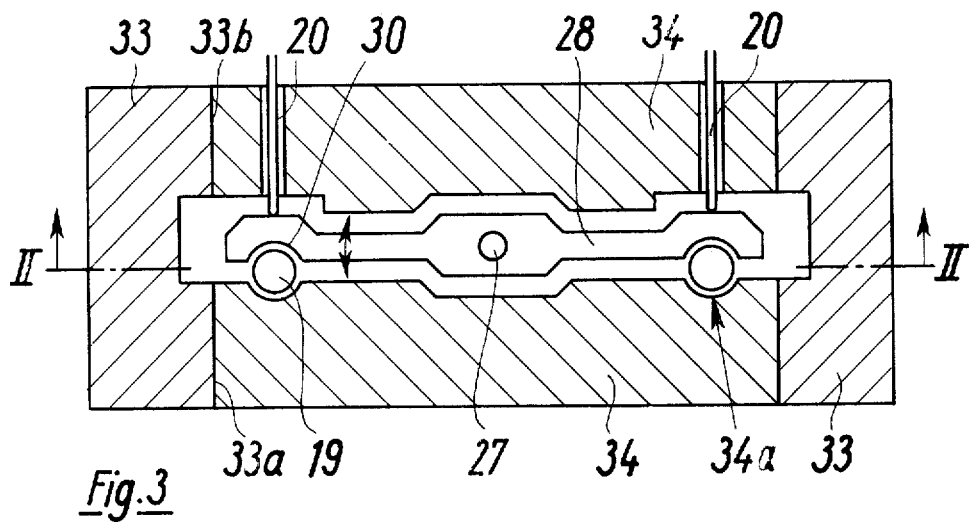
FIG. 3 shows a top view of the embodiment of FIG. 2 with partially cut away magnet members.

In order to remedy this situation, according to the invention and as shown in FIGS. 2, 3, and 4, it is proposed that the axis of rotation 27 of the magnetic bar 28, which corresponds to the course of the torsion rod 15 in the illustrated example, be disposed parallel to the direction of movement 29 of the extensions 19 of the valve cases. In addition, recesses 30, which are matched to the dimensions of the extensions 19, are provided in both ends of the magnetic bar 28. As shown in FIG. 4, the magnetic bar itself has a generally rectangular cross section, with side 31, which is located in the direction of movement of the extensions 19, being significantly greater than side 32. In this manner it is possible to make side 31 just large enough to correspond to the stroke of the extensions 19. As will be explained below on the basis of FIG. 5, it is then possible to utilize the entire stroke for increasing the magnetic force, without however the inertial forces of the magnetic bar 28 becoming too great.

Disposed on both ends of the magnetic bar 28 are horseshoe magnets 33, whose poles 33a and 33b are bridged by soft-iron members 34. These soft-iron members 34 can also have recesses 34a which are matched to the dimensions of the extensions 19. This provides a good magnetic circuit. In this connection, it should be noted that while the recesses 30 of the magnetic bar 28 are matched to the dimensions of the extensions 19, they are designed in such a manner that the necessary clockwise or counter-clockwise switching path of the magnetic bar 28 can be travelled, without the magnetic bar 28 striking the extensions 19. In addition, also provided in a known manner are the plungers 20, which are in a contacting relationship with the magnetic bar 28 and which ensure that the electrical circuit 12 (FIG. 1) is interrupted when the magnetic bar 28 swings.

FIG. 5 shows that the magnetic force increases steadily with the arrangement according to the present invention. Also indicated by way of explanation is the side 31 of the cross section of the magnetic bar 28 which extends parallel to the direction of movement of the extensions 19 and thus in the direction of the abscissa (and with it stroke H). The magnetic force increases generally linearly until the end of the cross section of the magnetic bar 28 has been reached. This ensures that the magnetic force does not decline, even with rapid stroke motions, thus ensuring dependable actuation by the magnetic bar. In addition, the embodiment according to the present invention also provides the advantage that the exerted magnetic force increases even more when the magnetic bar 28 swings, as indicated by the amount b, which results primarily from the reduction of the air gap during the swing motion.

The present invention thus provides an advantageous development of the subject matter of the prior proposal that permits the employment of magnetic monitoring devices with rapidly moving valves and, additionally, also provides a possibility for increasing the switching forces exerted by the magnetic bar 28 so that power switches which require greater forces for their actuation can also be properly tripped.

Obviously, many modifications and variations of the present invention are possible in the light of the above teachings. It should therefore be understood that within the scope of the appended claims, the invention may be practised otherwise than as specifically described.

Having thus fully disclosed my invention, what I claim is:

1. A device for monitoring the relative position of synchronously moved control elements, especially for monitoring the movement in a predetermined direction of movement of two valve cases in safety valves controlling a pneumatic or hydraulic drive, comprising a first member of magnetic material fixedly disposed at each of the valve cases, each first member being disposed proximate to a corresponding free end of a pivotally mounted magnetic bar whose basic position is aligned with said valve cases, said magnetic bar having an axis of rotation which is disposed parallel to said direction of movement, and means for magnetically influencing said magnetic bar responsive to asynchronous movement of said valve cases such that a signal is triggered for making said drive inoperative when said magnetic bar is swivelled out of said basic position.

2. The device according to claim 1, in which the ends of said magnetic bar have recesses which face the valve case members of magnetic material on the valve cases.

3. The device according to claim 2, in which said recesses are matched to the dimensions of the valve case members of magnetic material.

4. A device according to claim 1, wherein said magnetic bar has a generally rectangular cross section, with a side extending parallel to the axis of rotation which side is significantly larger than a side extending at right angles to said axis of rotation.

5. A device according to claim 1, wherein said magnetic means includes horseshoe magnets disposed at ends of said magnetic bar.

6. The device according to claim 5, in which the poles of the two horseshoe magnets disposed at the ends of said magnetic bar are bridged by soft-iron members.

7. The device according to claim 6, in which said soft-iron members have recesses which are matched to the dimensions of the magnetic members on the valve cases.

8. A device according to claim 1, wherein said valve cases are symmetrically arranged with respect to said first member of magnetic material.

9. A device according to claim 1, wherein said magnetic bar is operatively connected to trigger means for triggering said signal to make said drive inoperative in response to said swivelling of said magnetic bar.

10. A device according to claim 9, wherein said pivotal magnetic means is operatively connected to said trigger means via spring-biased plunger means.

11. A device for monitoring the relative positions of movable control means, especially movable valve means in a safety valve for controlling a pneumatic or hydraulic drive, said device comprising:
at least two movably mounted valve means each having a free valve means end movable in a given direction of movement,
pivotally mounted magnetic means having a free magnetic means end disposed proximate to each of said free valve means ends,
wherein the pivotal axis of said magnetic means extends substantially parallel to the direction of movement of said free valve means ends, and
means for magnetically influencing said pivotally mounted magnetic means responsive to asynchronous movement of said valve means such that a signal is triggered for making said drive inoperative when said pivotally mounted magnetic means is pivoted.

12. A device according to claim 11, wherein said pivotal magnetic means is operatively connected to trigger means for triggering said signal to make said drive inoperative in response to pivotal movement of said magnetic means.

13. A device according to claim 12, wherein each movable valve means has a portion spaced from said free end thereof which portion controls pressure chamber means.

14. A device according to claim 12, wherein said pivotal magnetic means is operatively connected to said trigger means via spring-biased plunger means.

15. A device according to claim 11, wherein each of said free ends is a member of magnetic material.

* * * * *